US005621059A

United States Patent [19]

Dupont et al.

[11] Patent Number: 5,621,059
[45] Date of Patent: Apr. 15, 1997

[54] POLYMERIC FLOW MODIFIERS

[75] Inventors: William A. Dupont; Marilyn A. Grolitzer, both of Wilbraham; Meshach Ojunga-Andrew, Springfield; Linda A. Paradis, Ludlow, all of Mass.

[73] Assignee: Monsanto Company, Springfield, Mass.

[21] Appl. No.: 549,449

[22] Filed: Oct. 27, 1995

Related U.S. Application Data

[63] Continuation of Ser. No. 383,626, Feb. 6, 1995, abandoned.

[51] Int. Cl.[6] .................................................. C08F 20/10
[52] U.S. Cl. ................................. 526/318.44; 526/318.4
[58] Field of Search ........................... 526/318.44, 318.4

[56] References Cited

U.S. PATENT DOCUMENTS

| | | | |
|---|---|---|---|
| 3,166,508 | 1/1965 | Fiels . | |
| 3,577,517 | 5/1971 | Kubot et al. | 526/318.44 |
| 3,764,587 | 10/1973 | Zunker | 526/318.44 |
| 3,787,378 | 1/1974 | Blank | 526/318.44 |
| 3,875,099 | 4/1975 | Kurth et al. | 526/318.44 |
| 3,952,135 | 4/1976 | Priddle et al. | 526/318.44 |
| 3,959,237 | 5/1976 | Blank | 526/318.44 |
| 4,085,264 | 4/1978 | Seib et al. | 526/318.44 |
| 4,120,841 | 10/1978 | Takahashi et al. . | |
| 4,131,572 | 12/1978 | Brendley . | |
| 4,983,186 | 1/1991 | Naiman et al. | 44/394 |
| 5,201,436 | 4/1993 | Owens et al. | 220/458 |
| 5,212,245 | 5/1993 | Franks et al. | 524/558 |
| 5,262,482 | 11/1993 | Smith et al. | 525/176 |

FOREIGN PATENT DOCUMENTS

| | | | |
|---|---|---|---|
| 2057577 | 6/1971 | Germany | 526/318.44 |
| 3610576 | 10/1987 | Germany | 526/318.44 |
| 52-3631 | 1/1977 | Japan | 526/318.44 |
| 416366 | 11/1974 | U.S.S.R. | 526/318.44 |
| 1535548 | 12/1978 | United Kingdom . | |
| 2173507 | 10/1986 | United Kingdom | 526/318.44 |

*Primary Examiner*—Joseph L. Schofer
*Assistant Examiner*—N. Sarofim
*Attorney, Agent, or Firm*—Fitzpatrick, Cella, Harper & Scinto

[57] ABSTRACT

Polymeric flow modifiers having a weight average molecular weight of between 4,000 to 450,000 consisting essentially of polymerized monomers on a weight basis as follows: 40 to 96% $C_1$ or $C_2$ alkyl acrylate or mixtures thereof; 4 to 12% acrylic acid; and 0 to 48% copolymerized acrylic acid ester monomer.

9 Claims, No Drawings

POLYMERIC FLOW MODIFIERS

This is a CONTINUATION of application Ser. No. 08/383,626, filed Feb. 6, 1995 now abandoned.

BACKGROUND OF THE INVENTION

This invention relates to additives for coating formulations to prevent surface defects and particularly to polymeric flow modifiers for waterborne coating formulations.

Polymeric flow modifiers in minor concentration in coatings are known. They minimize surface defects (craters, pin holes, fisheyes, etc.) during application of the uncured coating to a substrate and therefore particularly enhance surface gloss after curing. Waterborne coatings are being increasingly emphasized over systems containing organic solvents. Polymeric flow modifiers for use in traditional organic solvent-based systems may be incompatible with waterborne systems.

SUMMARY OF THE INVENTION

Now improvements in polymeric flow modifiers have been made which facilitate use in waterborne coating formulations.

Accordingly, a principal object of this invention is to provide a class of polymeric flow modifiers tailored for use in waterborne coating systems but also usable alternatively in other types of industrial coatings.

Other objects of this invention will in part be obvious and will in part appear from the following description and claims.

These and other objects are accomplished by providing polymeric flow modifiers having a weight average molecular weight of between 4,000 to 450,000 consisting essentially of polymerized monomers on a weight basis as follows:

40 to 96% $C_1$ or $C_2$ alkyl acrylate or mixtures thereof;

4 to 12% acrylic acid; and 0 to 48% copolymerized acrylic acid ester monomer. The foregoing compositions function particularly effectively as flow modifiers in waterborne coatings as well as other types of industrial coatings depending on the flow modifier composition chosen. Waterborne coatings are of two types—water soluble and water dispersible. In water soluble, the solution polymerized resin component is acidic and is neutralized by a base such as an amine, ammonia, AMP-95 (hereinafter described) or the like before introducing water as the resin solvent. The resin is usually crosslinkable with other polymers. In water dispersible, the resin component is emulsion polymerized in water and may be crosslinkable or not depending on functional groups present.

DETAILED DESCRIPTION

Flow modifiers of the invention are the polymerized product of i) $C_1$ or $C_2$ alkyl acrylate or mixtures of such acrylates; ii) acrylic acid; and iii) optionally one or more up to 48% other copolymerizable acrylic acid ester monomers. Such flow modifier polymers are liquid at room temperature with the optional monomer(s) usually included to reduce viscosity and facilitate handling of such liquid products.

Copolymerizable acrylic acid ester monomers usable as component iii) include: propyl acrylate, isopropyl acrylate, butyl acrylate, isobutyl acrylate, hexyl acrylate, 2-ethylhexyl acrylate, nonyl acrylate, lauryl acrylate, stearyl acrylate, cyclohexyl acrylate and isodecyl acrylate. The glass transition temperatures (Tg) of alkyl alkacrylates such as methyl methacrylate are too high (+100° C. for methyl methacrylate) for use in flow modifiers where Tg's are typically less than 20° C., e.g. between plus 20 to minus 40° C. Inclusion of alkyl alkacrylates in flow modifier compositions of the invention at levels adversely affecting flow modifier performance (e.g. more than about 1%) is undesirable and not within the scope of this invention.

To function effectively in the preferred waterborne coatings, the molecular weight (weight average) of the flow modifiers must be between 4,000 to 450,000. If less than 4000 the polymer is ineffective in controlling surface defects. On the other hand, if greater than 450,000, coating gloss and distinction of image (defined hereafter) properties are inadequate because the flow modifier copolymer is incompatible with and immobile in the coating. Preferred weight average molecular weight is between 5,000 to 60,000.

The content (on a weight basis) of polymerized monomers in the polymeric flow modifiers is from 40 to 96% of i) and 4 to 12% of ii). When component iii) is present, the amount can be up to 48%. Preferred ranges for optimum performance in waterborne systems are 80 to 96% of i), 4–12% of ii) and 0–15% of iii) wherein the copolymerizable monomer is entirely ethyl hexyl acrylate (EHA) or butyl acrylate (BA) or a mixture of EHA and BA.

The polymer compositions are generally prepared in the presence of solvents including hydrocarbons such as ketones, alcohols, esters, etc. Specific solvent examples include toluene, ethyl acetate, mineral spirits, aromatic naphtha, acetone, methylisobutyl ketone, methylethyl ketone, ethyl alcohol, isopropanol, ethylene glycol, monoether acetate, butoxyethanol, etc. Solvent type affects molecular weight of the polymer. The presence of alcohol in the solvent generally lowers molecular weight whereas little or no alcohol is used for higher molecular weights—typically solely alkyl ester solvent.

A polymerization catalyst is generally included when polymerizing the mixtures forming the desired polymers. About 0.1 to about 2% by weight or more, based on the combined weight of the monomers, of polymerization catalyst is used. Any catalyst known in the art for polymerizing acrylic and vinyl monomers can be used. Typical catalysts include azo-bis-isobutyronitrile, benzoyl peroxide, acetyl peroxide, dicumyl peroxide, cumene hydroperoxide, ethyl 3,3-di(t-amylperoxy)butyrate, etc. Catalyst mixtures can be used.

The polymer compositions described above are useful as flow modifiers in coating formulations which include thermoplastic and thermoset resins such as polyester resins, alkyd resins, acrylic resins, polyurethane resins, vinyl acetate resins, melamine resins, epoxy resins, vinyl acrylic resins, cellulosic resins and phenolic resins. A preferred group of the foregoing consists of polyester, acrylic and alkyd resins. The polymeric flow modifier should be incorporated into the coating formulation in an amount effective to improve flow and provide the desired properties in the cured coating. In general, about 0.1% to about 3.5%, preferably 1 to 2% by weight (based on total resin solids weight in the coating formulation) of the polymer flow modifier compositions should be used.

Polyester coating resins may be either saturated or unsaturated formed by condensing a polycarboxylic acid or anhydride (either saturated or unsaturated) with at least one polyhydric alcohol. Illustrative polyester resins are the products of the reaction of a saturated dicarboxylic acid or anhydride such as phthalic acid or anhydride, isophthalic acid, tetrahydrophthalic anhydride, hexahydrophthalic anhydride, succinic acid, glutaric acid, adipic acid, pimelic aid, suberic acid, azelaic acid and sebacic acid, and an unsaturated dicarboxylic acid or anhydride such as maleic anhydride, fumaric anhydride, chloromaleic acid, itraconic acid, citraconic acid and mesaconic acid with a dihydric alcohol such as ethylene glycol, propylene glycol, butylene glycol, diethylene glycol, triethylene glycol, and neopentyl glycol. Small amounts of a polyhydric alcohol such as glycerol, pentaerythritol, trimethylolpropane, or sorbitol may be used in combination with the glycol.

Alkyd coating resins are the polymerization products of polyhydric alcohols and polybasic acids modified with monobasic fatty acids. Non-oil or oil-free alkyds, best described as saturated or hydroxylated reactive polyesters, are formed by the reaction of polybasic acids with excess polyhydric alcohols.

Alkyd resins generally are classified by alkyd ratio or polyhydric alcohol:phthalate ratio, oil length or percent oil for alkyds containing glycerol as the only polyol, and percent phthalic anhydride. Alkyds are broadly classified into four types: short (30–42% fatty acid content, 38–46% phthalic anhydride content); medium (43–54% fatty acid content, 30–37% phthalic anhydride content); long (55–68% fatty acid content, 20–30% phthalic anhydride content); and very long (>68% fatty acid content, <20% phthalic anhydride content). The percentage of fatty acid content influences the properties of alkyd resins.

Among polyhydric alcohols which can be used to prepare alkyd resins, glycerol is most widely used followed by pentaerythritol. Polyols such as sorbitol and diethylene glycol have also been used.

Phthalic acid and isophthalic acid have been the most widely used polybasic acids in the preparation of alkyd resins.

In one embodiment, the alkyd resin and polyester resin formulations usable herein will also contain an unsaturated monomer capable of reacting with the alkyd resin or unsaturated polyester resin to form cross-linkages. The unsaturated monomers include vinyl or acrylate monomers, and these are incorporated into the formulations as reactive diluents. Suitable unsaturated monomers include styrene, methyl styrene, dimethyl styrene, vinyl toluene, divinyl benzene, dichloro styrene, methyl acrylate, ethyl acrylate, methyl methacrylate, ethyl methacrylate, diallylphthalate, vinyl acetate, acrylonitrile, acrylamide, vinyl chloride, vinylidene chloride, vinyl formate, vinyl acetate, vinyl butyrate, vinyl stearate, etc. Mixtures of such monomers such as methyl methacrylate and butyl acrylate, styrene and ethyl or butyl acrylate, or acrylonitrile and ethyl acrylate also may be utilized.

The alkyd and polyester resin formulations which are modified with one or more of the above unsaturated monomers may contain from about 20% to about 80% by weight of non-volatile material.

Coating resins utilized with flow modifiers of the invention may be derived from at least one curable acrylic resin derived from acrylic acid, methacrylic acid, or esters of acrylic acid or methacrylic acid by techniques known to those skilled in the art. Most acrylics are based on methyl methacrylate monomer which can be produced in a two-step process where acetone is reacted with hydrogen cyanide to form acetone cyanohydrin, and this intermediate is heated with methanol in the presence of an acid such as sulfuric acid to produce methyl methacrylate monomer. The acrylic resins may comprise homopolymers or copolymers of methyl methacrylate with other acrylates such as methyl or ethyl acrylate. The acrylic resins can be modified with various ingredients including butadiene, vinyl, and butyl acrylate to improve certain properties.

Vinyl resins such as those derived from vinyl acetate, vinyl halides, etc., also can be used as coating resins with the flow modifiers of the invention.

Examples of thermosetting resins which can be used include polyurethane resins, melamine resins, epoxy resins, and phenolic resins. The epoxy resins contain a reactive functional group (oxirane ring) in their molecular structure. The epoxy resins may be any of those commercially available from a variety of sources. The term "epoxy resin" describes the products of the condensation reaction of an epihalohydrin and a hydroxy-containing compound or carboxylic acid. Thus, epoxy resins may be of the ether or ester types.

Ester-type epoxy resins include polyglycidyl esters obtained by the reaction of a compound containing two or more carboxylic acid groups per molecule with epichlorohydrin or glycerol dichlorohydrin in the presence of an alkali. Such polyglycidyl esters may be derived from aliphatic polycarboxylic acids, e.g., succinic acid, glutaric acid, adipic acid, pimelic acid, etc.; from cycloaliphaticpolycarboxylic acids such as tetrahydrophthalic acid; and from aromatic polycarboxylic acids such as phthalic acid, isophthalic acid, and terephthalic acid.

Ether-type epoxy resins are obtained by the reaction of a compound containing at least two free alcoholic hydroxyl and/or phenolic hydroxyl groups per molecule with an epihalohydrin under alkaline conditions, or in the alternative, in the presence of an acidic catalyst with subsequent treatment with an alkali. The products of such reactions are generally complex mixtures of glycidyl polyethers. These esters may be made from acyclic alcohols such as ethylene glycol, diethylene glycol, propane-1,2-diol, hexane-2,4 6-triol, glycerol, etc.; from cycloaliphatic alcohols such as bis(4-hydroxycyclohexyl)methane; and alcohols having aromatic nuclei such as N,N-bis(2-hydroxyethyl)aniline, and p,p'-bis(2-hydroxyethylamino)diphenylmethane. The epoxy resins also may be derived from mononuclear phenols such as resorcinol or from polynuclear phenols such as bis(4-hydroxyphenyl)methane (otherwise known as bisphenol F), 4,4'-dihydroxydiphenyl, 2,2-bis(4-hydroxyphenyl) propane (otherwise known as bisphenol A), and 2,2-bis (3,5-dibromo-4-hydroxyphenyl) propane.

The most widely used epoxy resins are diglycidyl ethers of bisphenols, especially bisphenol A. These are made by reacting epichlorohydrin with bisphenol A in the presence of an alkaline catalyst. By controlling the operating conditions and varying the ratio of epichlorohydrin to bisphenol A, products of different molecular weight can be made. Other usable epoxy resins include the diglycidyl ethers of other bisphenol compounds such as bisphenol B, F, G and H.

Epoxy resins as described above based on various bisphenols are available from a variety of commercial sources. One group known by the general trade designation "Epon" resins and another group of epoxy resins identified under the general trade designation EPI-REZ are both available from Shell Chemical Company.

Coating resins usable with the flow modifiers of the invention also include phenolic resins which are the reaction products of phenol and formaldehyde.

Polyurethanes (sometimes referred to as urethanes) are also useful coating resins. Polyurethanes generally are formed by the reaction of a polyisocyanate and a polyol. By varying the combinations of polyisocyanates and polyols, polyurethanes having a variety of desirable properties can be obtained. Two polyols often used in the formation of polyurethanes are polyester polyols and polyether polyols.

Amino resins which can be utilized include urea resins and melamine formaldehyde resins. Both urea and melamine can react with formaldehyde to initially form monomeric addition products. For example, a single molecule of urea readily combines with two molecules of formaldehyde to form dimethylol urea. As many as six molecules of formaldehyde can add to a melamine molecule to form hexylmethylol melamine. These methylolated species can further condense in the presence of an acid catalyst to produce methylene or methylene ether linkages. Further condensation results in the formation of a variety of resins, and the particular resin characteristics can be obtained by control of pH, reaction temperature, reactant ratio, amino monomer and a degree of polymerization. The liquid coating resins are prepared by reacting methanol or butanol or a combination of methanol and butanol (coetherified) with the initial methylolated products. These methylated and butylated resins can then be used to produce hard, solvent-resistant coatings by heating with hydroxyl, carboxyl and amide functional polymers.

In addition to coating resins and flow modifiers of the invention, coating formulations typically also contain solvents (either organic or water or mixtures of both), surface-active agents, bodying agents, extender pigments, crosslinkers, plasticizing agents, etc.

Pigments used in coating formulations include any of the known organic and inorganic pigments, whether natural or synthetic. Examples of organic pigments include azo-insoluble pigments such as toluidines, naphthol reds, benzidines and dinitraniline orange; the acid azo pigments such as lithol, Persian orange and tartrazine; the phthalocyanine pigments such as phthalocyanine blues and greens; the basic PNA and PTA pigments such as rhodamine, malachite green, ethyl violet and victoria blue. Examples of inorganic pigments include metal flakes; natural red oxide pigments; chromates such as lead chromate; zinc sulfide pigments such as zinc sulfide, lithophone, etc.; zinc oxide; antimony oxide; titanium pigments such as titanium dioxide, tinted titanium pigments; titanates such as barium, zinc, lead and magnesium titanate; pearlescent pigments such as mica which has been plated with a coating of titanium dioxide or iron oxide, etc. All of these pigments are discussed in detail in Vol. II of Organic Coating Technology, "Pigments and Pigmented Coatings" by Henry F. Payne, John Wiley & Sons, Inc. New York, 1961. The ratio of pigment to coating resin in the coating formulation will depend upon the usual factors considered in coating chemistry when determining such ratios. For example, the ratio is experimentally determined taking into consideration such desired properties as hiding power, cover, shade, flexibility, mechanical strength, consistency and flow properties.

Examples of surface-active agents include oleic and other organic acids; lecithin; hydrogenated castor oil; aluminum and calcium stearates; silicone oils; and pine oil. Bodying agents increase consistency of the coating by producing a thixotropic condition. Metallic soaps have been used widely as bodying and anti-settling agents, and examples include aluminum, zinc, magnesium, calcium and lead stearates.

Extender pigments are lower in price than prime pigments and therefore reduce cost and improve properties such as consistency, leveling and pigment settling. Extender pigments are obtained either by pulverizing certain rocks and sedimentary deposits, or by chemical precipitation. Aluminum silicates have been found to be particularly useful as extender pigments. Examples of plasticizing agents which may be included in the coating formulation include glycerine, glycerol, triphenyl phosphate, dibutyl phthalate, and dioctyl phthalate.

Crosslinking agents can be included in the coating formulations such as for example, small amounts of alkylated melamine formaldehyde resin. The alkyl group contains from 1 to 4 carbon atoms, and the resin can be prepared by conventional techniques in which an alcohol such as methanol, ethanol, butanol, isobutanol, etc., is reacted with a melamine formaldehyde resin. The resin can be monomeric or polymeric. A preferred crosslinking resin providing a high quality finish is hexamethoxymethyl melamine available commercially as Resimene® 747 from Monsanto Company. Another is methoxybutoxymethyl melamine such as Resimene 755. About 5 to about 50% by weight of crosslinker based on the weight of coating resin, can be included in the coating formulation.

The coating formulations in which the flow modifiers of the invention are used can be either liquid or powder. With powder coatings, the thermoplastic or thermoset coating resin, crosslinker, filler and pigment components are ground, melt mixed with flow modifier, cooled and ground again. The powder formulation is then applied to the coating substrate by conventional means and oven baked for curing.

Test procedures used in preparing and evaluating the properties and performance of the flow modifiers of the invention are as follows:

A. Polymeric Flow Modifier Properties
  1. Molecular Weight (Mw) by size exclusion chromatography.
  2. Viscosity (ASTM-D2196).

B. Coating Performance Properties
  1. Distinction of Image measured by Hunter Lab Dorigon Model D47R-6.
  2. Gloss (20° and 60°)-ASTM D523
  3. Surface Defect Rating (SDR) is the sum of individual numbers measuring each of the following defects: a) craters which are mounds or dimples formed during drying or curing causing voids in the coating; b) pinholes from air or solvent entrapment; c) flow (draw down wire marks); and d) orange peel (waviness of surface). A number between 1 and 10—(the higher the better the performance) is assigned based on visual assessment of the severity and frequency of each of the above four defects (a) through (d) in a 4 in×12 in (9.6×4.7 cm) sample. SDR of a sample is the sum of the four numbers assigned to that sample. To justify a flow modifier in a coating formulation, SDR with flow modifier should be at least 10% higher than for a control without flow modifier.

The invention is further described in the following examples which are for illustration only and not to limit or restrict the invention. Unless otherwise indicated, parts and percentages are by weight.

EXAMPLE 1

Preparation of Polymer Flow Modifiers

To an agitated reaction flask equipped with condenser and thermometer, is charged;

16.12 parts, 2-ethyl hexyl acrylate (EHA)

135.43 parts ethyl acrylate (EA)

9.67 parts acrylic acid (AA)

612.33 parts isopropanol 0.2532 parts butanenitrile, 2-methyl, 2,2'-azobis (Vazo 67® from dupont)

The reactor contents are heated to and maintained at a reflux temperature of 70°–85° C. for 20 min. Then the following premix is added over 10 min. while maintaining reflux:

37.67 parts isopropanol
0.2532 parts Vazo 67

After addition, the solution is held at reflux for 30 min. Then a monomer premix of:

16.12 parts EHA
135.43 parts EA
9.67 parts AA and an initiator solution containing:

292.04 parts isopropanol
1.6036 parts Vazo 67 are added simultaneously over one hour. The reaction mixture is maintained at 70°–85° C. for 1.5 hours to complete polymerization. Vacuum (26 to 30 inch mercury) is applied until the temperature reaches 70°–85° C. at which temperature solvent and residual monomer are removed.

The liquid polymer, consisting essentially of (in weight parts) 10/84/6, EHA/EA/AA is diluted to approximately 50% total solids by adding for every 50 parts polymer:

22.5 parts water and
5.0 parts AMP®-95 (2 amino, 2 methyl, 1-propanol) from Angus Chemical Company.
followed by 22.5 parts water The solution is mixed for 15 min. at 60°–75° C. at 200 rpm. Analysis gave the following results:

Mw 5600
pH 8.6
Viscosity 25,550 cps
APHA Color 86

EXAMPLES 2–7

The general procedure of Example 1 is repeated using reactants and amounts in following Table 1 except that the type and amount of solvent is varied to vary polymer molecular weight.

TABLE 1

| Reactant/Example | 2 | 3 | 4 | 5 | 6 | 7 |
|---|---|---|---|---|---|---|
| ethyl acrylate | 92 | — | 48.5 | 71 | 58 | 92 |
| acrylic acid | 8 | 6 | — | 6 | 6 | 8 |
| methyl acrylate | — | 94 | 3 | — | 12 | — |
| ethyl hexyl acrylate | — | — | 48.5 | 23 | 12 | — |
| butyl acrylate | — | — | — | — | 12 | — |

The polymers of Table 1 have the following molecular weight properties:

TABLE 2

| Example | Mw |
|---|---|
| 2 | 23,250 |
| 3 | 5,600 |
| 4 | 26,910 |
| 5 | 5,600 |
| 6 | 304,300 |
| 7 | 310,000 |

EXAMPLES 8–11

Preparation of Coating Formulations

Example 8

Water Reducible Polyester Coating

The following ingredients are charged to a 500 ml stainless steel vessel:

263 g water reducible polyester—type 72-7203 from McWhorter Co.
16 g AMP-95 neutralizing agent—2-amino, 2-methyl 1-propanol
70 g distilled water The mixture is mixed for 5 min. (low speed) and then 245 g TiO2 charged. The mixture is then dispersed at high speed to Hegman 7-8 (ASTM D1210) and thereafter is added with agitation:

80.0 g Resimene® 747 crosslinker from Monsanto Co.
3.5 g AMP-95

Mixing is continued for 10 min. and thereafter 560 g distilled water is added while agitation continues.

Example 9

Water Reducible Acrylic Coating

The mixing procedure and charging sequence of Example 8 is repeated using the following formulation:

154 g water reducible acrylic 17-7240—McWhorter Co.
14 g AMP-95
110 g distilled $H_2O$
135 g TiO2

The mixture is mixed as in Ex. 8 and then is added:

78 g Resimene 747
3.5 g AMP-95
470 g distilled $H_2O$

After the last water charge a premix is added of:

15 g distilled $H_2O$
1.9 g K-cure® 1040w from King Industries (para toluene sulfonic acid)
0.6 g AMP-95

Example 10

Water Reducible Alkyd Coating

The mixing procedure and charging sequence of Example 8 is repeated using the following formulation:

221 g water reducible alkyd (77-7451 from McWhorter Co.)
14 g AMP-95
55 g distilled $H_2O$
198 g TiO2

The mixture is mixed as in Ex. 8 and then is added:

122 g water reducible alkyd (77-7451)
51 g Resimene 747
3 g AMP-95
709 g distilled $H_2O$
20 g Acrosolv (dipropylene glycol methyl ether)

Example 11

Water Dispersible Acrylic Coating

The mixing procedure and charging sequence of Example 8 is repeated using the following formulation:

187 g water dispersible acrylic—Joncryl® 540 from S. C. Johnson 172 g TiO2 disperse to Hegman 7-8 then add:

262 g Joncryl 540 mix for 10 min. then add 135 g Resimene 747

170 g distilled $H_2O$ 57 g Arcosolv® DPM (dipropylene glycol methyl ether)

mix (10 min.) and then add premix of:

10 g distilled $H_2O$ 0.4 g AMP-95

1.0 g K-cure 1040W

Example 12

Solvent Based Acrylic Polyol/Melamine Coating

The mixing procedure of Example 8 is repeated using the following formulation (amounts in gms):

Joncryl 500 176.0 (80% non-volatiles)

Resimene 755 62.0 n-butanol 30 toluene 15

Exxate® 600 ($C_6$ alkyl acetate) 35 from Exxon Chemical methyl ethyl ketone 70

K-cure 1040 0.2

The coating formulations have the following properties:

| Property/Example | 8 | 9 | 10 | 11 | 12 |
|---|---|---|---|---|---|
| pH | 8–9 | 8–9 | 8–9 | 8–9 | — |
| Viscosity (cps) | 150–180 | 100–120 | 100–150 | 100–150 | 14 |
| % non-volatile | 43–44 | 34–35 | 36–37 | 50–51 | 45 |
| pigment/binder ratio | 45/55 | 42/58 | 39/61 | 34/66 | — |
| resin/cross-linker ratio | 72/28 | 59/41 | 83/17 | 60/40 | 70/30 |

EXAMPLES 13–17

Flow Modifier Evaluation In Coating Formulations

The flow modifiers of Examples 1–7 are reduced to 25% solids (from 50% as prepared) with propylene glycol monopropyl ether and evaluated in the coating formulations of Examples 8–12 at three concentration (based on coating resin solids). The coatings containing the dispersed flow modifiers are applied to phosphated steel panels with #75 wire wound rod to give 1.0–1.5 mil (0.025–0.038 mm) dry film thickness. The films are flashed off for 10 min. before baking at 120° C. for 45 min. except the Ex. 10 coating is baked for 20 min. Flow modifier performance is recorded in Table 3.

TABLE 3

| Flow Modifier | Monomer Conc. in Polymer | | | | % used | D.O.I. | Gloss at 20° | 60° | SDR |
|---|---|---|---|---|---|---|---|---|---|
| | MA | EHA | EA | AA | | | | | |

Example 13 - In water reducible polyester coating of Ex. 8

| Flow Modifier | MA | EHA | EA | AA | % used | D.O.I. | 20° | 60° | SDR |
|---|---|---|---|---|---|---|---|---|---|
| Ex. 1 | — | 10 | 84 | 6 | 0.5 | 81.7 | 87.5 | 94.8 | 5.7 |
| | | | | | 2.0 | 78.4 | 86.6 | 94.5 | 6.2 |
| | | | | | 3.0 | 82 | 86.4 | 93.9 | 6.2 |
| Ex. 2 | — | — | 92 | 8 | 0.5 | 75.6 | 76.9 | 87.2 | 6.8 |
| | | | | | 2.0 | 84.6 | 65.0 | 78.1 | 7.8 |
| | | | | | 3.0 | 80.4 | 69.4 | 80.2 | 7.3 |
| Ex. 3 | 94 | — | — | 6 | 0.5 | 76.7 | 74.1 | 85.3 | 7.0 |
| | | | | | 2.0 | 75.2 | 71.8 | 84.8 | 7.0 |
| | | | | | 3.0 | 83.8 | 78.3 | 89.6 | 8.0 |
| Ex. 4 | — | 48.5 | 48.5 | 3 | 0.5 | 4.6 | 34.3 | 79.4 | 1.2 |
| | | | | | 2.0 | 20.0 | 42.6 | 77.3 | 1.5 |
| | | | | | 3.0 | 21.0 | 53.3 | 77.9 | 1.5 |
| Ex. 5 | — | 23 | 71 | 6 | 0.5 | 79.1 | 83.8 | 93.6 | 6.0 |
| | | | | | 2.0 | 78.4 | 80.5 | 90.9 | 6.0 |
| | | | | | 3.0 | 79.1 | 77.3 | 88.8 | 6.0 |
| Ex. 6 | 12 | 12 | 58 | 6 | 0.5 | 48.8 | 71.3 | 90.1 | 2.25 |
| | and 12% butyl acrylate | | | | 2.0 | 44.7 | 71.3 | 88.7 | 3.0 |
| | | | | | 3.0 | 65.3 | 73.1 | 89.6 | 4.25 |
| Ex. 7 | — | — | 92 | 8 | 0.5 | 87.7 | 83.7 | 92.7 | 7.0 |
| | | | | | 2.0 | 81.0 | 78.4 | 88.8 | 7.7 |
| | | | | | 3.0 | 80.4 | 78.7 | 89.2 | 7.7 |
| Control - no flow modifier | | | | | | 75.3 | 71.2 | 88.5 | 5.8 |

| Flow Modifier | % used | DOI | Gloss 20° | 60° | SDN |
|---|---|---|---|---|---|

Example 14 - In water reducible acrylic coating of Example 9

| Flow Modifier | % used | DOI | 20° | 60° | SDN |
|---|---|---|---|---|---|
| Ex. 1 | 0.5 | 81.3 | 67.5 | 87.6 | 7.3 |
| | 2.0 | 83.9 | 72.5 | 90.6 | 7.8 |

TABLE 3-continued

|  |  |  |  |  |  |
|---|---|---|---|---|---|
|  | 3.0 | 81.5 | 72.1 | 89.9 | 8.5 |
| Ex. 2 | 0.5 | 77.9 | 68.9 | 89.5 | 7.8 |
|  | 2.0 | 74.6 | 72.9 | 90.9 | 8.5 |
|  | 3.0 | 82.1 | 74.1 | 91.4 | 7.5 |
| Ex. 3 | 0.5 | 83.0 | 72.2 | 90.9 | 8.5 |
|  | 2.0 | 78.7 | 74.4 | 91.4 | 8.5 |
|  | 3.0 | 82.2 | 69.5 | 89.4 | 8.5 |
| Ex. 4 | 0.5 | 7.0 | 24.5 | 65.9 | 0.5 |
|  | 2.0 | 24.4 | 58.7 | 86.9 | 1.0 |
|  | 3.0 | 28.3 | 62.9 | 86.1 | 1.0 |
| Ex. 5 | 0.5 | 79.9 | 82.2 | 94.2 | 6.5 |
|  | 2.0 | 63.4 | 76.3 | 92.5 | 6.75 |
|  | 3.0 | 67.0 | 72.1 | 91.1 | 6.75 |
| Ex. 6 | 0.5 | 73.1 | 79.9 | 92.9 | 6.75 |
|  | 2.0 | 81.4 | 75.7 | 92.1 | 7.25 |
|  | 3.0 | 77.5 | 69.6 | 90.3 | 7.00 |
| Ex. 7 | 0.5 | 74.4 | 86.5 | 94.6 | 6.75 |
|  | 2.0 | 67.5 | 87.8 | 95.1 | 7.25 |
|  | 3.0 | 74.5 | 86.6 | 94.2 | 7.25 |
| Control - no flow modifier |  | 69.8 | 69.0 | 84.6 | 4.75 |
| Example 15 - In water reducible alkyd coating of Example 10 | | | | | |
| Ex. 1 | 0.5 | 58.5 | 88.7 | 96.0 | 2.75 |
|  | 2.0 | 63.2 | 86.1 | 95.1 | 4.50 |
|  | 3.0 | 58.7 | 82.7 | 94.0 | 5.75 |
| Ex. 2 | 0.5 | 16.4 | 87.8 | 95.3 | 6.25 |
|  | 2.0 | 83.8 | 90.7 | 95.7 | 7.0 |
|  | 3.0 | 69.0 | 90.9 | 96.8 | 7.0 |
| Ex. 3 | 0.5 | 47.6 | 90.7 | 95.5 | 6.75 |
|  | 2.0 | 52.5 | 86.8 | 95.1 | 7.25 |
|  | 3.0 | 57.6 | 85.2 | 95.3 | 7.25 |
| Ex. 4 | 0.5 | 45.4 | 75.7 | 91.9 | 3.5 |
|  | 2.0 | 38.8 | 71.8 | 91.8 | 4.5 |
|  | 3.0 | 34.8 | 65.4 | 90.0 | 5.25 |
| Ex. 5 | 0.5 | 66.0 | 88.2 | 96.3 | 5.75 |
|  | 2.0 | 59.8 | 88.1 | 96.5 | 6.50 |
|  | 3.0 | 58.0 | 87.1 | 96.2 | 6.75 |
| Ex. 6 | 0.5 | 51.4 | 75.3 | 90.9 | 5.25 |
|  | 2.0 | 54.5 | 74.6 | 90.1 | 5.75 |
|  | 3.0 | 44.6 | 62.6 | 85.9 | 6.0 |
| Ex. 7 | 0.5 | 65.2 | 85.1 | 94.8 | 6.75 |
|  | 2.0 | 61.2 | 82.0 | 94.0 | 7.50 |
|  | 3.0 | 55.0 | 79.6 | 93.4 | 7.50 |
| Control - no flow modifier |  | 36.8 | 78.0 | 94.8 | 5.75 |
| Example 16 - In water dispersible acrylic coating of Example 11 | | | | | |
| Ex. 1 | 0.5 | 60.7 | 90.1 | 97.4 | 7.5 |
|  | 2.0 | 59.3 | 89.4 | 97.1 | 8.5 |
|  | 3.0 | 56.9 | 89.2 | 96.9 | 7.8 |
| Ex. 2 | 0.5 | 58.5 | 90.0 | 97.1 | 8.5 |
|  | 2.0 | 60.5 | 89.9 | 97.0 | 8.5 |
|  | 3.0 | 61.7 | 89.6 | 97.1 | 8.0 |
| Ex. 3 | 0.5 | 59.7 | 90.6 | 97.3 | 8.5 |
|  | 2.0 | 63.6 | 89.0 | 96.7 | 8.5 |
|  | 3.0 | 57.6 | 84.1 | 94.6 | 8.5 |
| Ex. 4 | 0.5 | 28.5 | 31.0 | 71.6 | 1.37 |
|  | 2.0 | 22.7 | 61.2 | 87.4 | 2.50 |
|  | 3.0 | 17.7 | 54.6 | 85.3 | 3.33 |
| Ex. 5 | 0.5 | 37.0 | 87.8 | 96.4 | 7.0 |
|  | 2.0 | 46.4 | 88.3 | 96.6 | 7.75 |
|  | 3.0 | 51.2 | 87.7 | 96.3 | 8.0 |
| Ex. 6 | 0.5 | 31.3 | 76.6 | 92.5 | 3.25 |
|  | 2.0 | 29.4 | 70.3 | 89.7 | 4.0 |
|  | 3.0 | 18.4 | 60.9 | 85.8 | 4.25 |
| Ex. 7 | 0.5 | 47.4 | 82.0 | 95.4 | 7.0 |
|  | 2.0 | 32.5 | 73.6 | 93.1 | 7.5 |
|  | 3.0 | 20.4 | 63.8 | 86.2 | 8.0 |
| Control - no flow modifier |  | 45.7 | 77.0 | 92.6 | 5.0 |
| Example 17 - In solvent based acrylic polyol/melamine coating | | | | | |
| Ex. 4 | 0.5 | 54.9 | 87.2 | 94.8 | 5.7 |
|  | 2.0 | 48.0 | 90.6 | 95.6 | 6.25 |
|  | 3.0 | 44.3 | 91.0 | 96.1 | 6.25 |
| Ex. 5 | 0.5 | 73.6 | 92.8 | 96.2 | 6.0 |
|  | 2.0 | 56.1 | 92.9 | 96.0 | 6.7 |
|  | 3.0 | 74.7 | 91.1 | 95.8 | 6.7 |
| Ex. 6 | 0.5 | 74.6 | 92.8 | 96.7 | 5.75 |
|  | 2.0 | 59.7 | 92.2 | 96.3 | 6.2 |
|  | 3.0 | 67.3 | 89.0 | 97.0 | 6.25 |

TABLE 3-continued

| Ex. 7 | 0.5 | 55.6 | 91.9 | 96.6 | 6.0 |
| --- | --- | --- | --- | --- | --- |
| | 2.0 | 41.4 | 90.4 | 96.2 | 6.7 |
| | 3.0 | 69.4 | 93.8 | 96.7 | 6.7 |
| Control - no flow modifier | | 47.8 | 92.5 | 96.0 | 6.2 |

The foregoing data illustrates that the polymeric flow modifiers vary in effectiveness with the content of the flow modifier polymer and the particular coating compositions used. Certain flow modifier compositions are more effective in some waterborne coatings than in others. For example, the 10/84/6 polymer of Example 1 is quite effective in the water reducible acrylic formulation of Example 14 but inferior to the control in the particular water reducible alkyd formulation of Example 15. Moreover, flow modifier effectiveness varies with the molecular weight and composition of coating resin in a waterborne coating. By tailoring the molecular weight and monomer composition of the flow modifier within the parameters and ranges defined herein, an optimum flow modifier composition can be developed by one skilled in the art to provide a desirable set of properties using tests described above.

The flow modifiers of the invention are particularly adapted for use in waterborne coating formulations but also can be used in solvent-based and powder coatings. For example, the Example 7 flow modifier 92/8 EA/AA—310,000 Mw is significantly better in performance (Example 17) than the control without flow modifier.

The coating compositions containing the polymeric flow modifier of this invention can be applied over a variety of substrates such as metal, wood, glass, plastics and the like, by any conventional application method such as spraying, electrostatic spraying, dipping, brushing, flow-coating, roller coating, etc. The viscosity of the coating composition can be adjusted by adding solvents if necessary. The coatings are cured by baking at about 150°–250° C. for about 10 seconds to about 4 or 5 minutes or more. Coating thicknesses from about 0.5 to about 5 mils are usually satisfactory.

The preceding description is for illustration and should not be taken as limiting. Various modifications and alterations will be readily suggested to persons skilled in the art. It is intended, therefore, that the foregoing be considered as exemplary only and that the scope of the invention be ascertained from the following claims.

We claim:

1. Flow modifiers for coating formulations consisting essentially of polymers having a weight average molecular weight of between 4,000 to 450,000 of polymerized monomers on a weight basis as follows:

40 to 96% $C_1$ or $C_2$ alkyl acrylate or mixtures thereof;

4 to 12% acrylic acid; and 0 to 48% copolymerized $C_3$ or higher acrylic acid ester monomer; said polymers serving to modify flow of said coating formulations during application to a substrate.

2. The flow modifiers of claim 1 wherein the alkyl acrylate is ethyl acrylate.

3. The flow modifiers of claim 2 wherein the % ethyl acrylate is 80 to 95.

4. The flow modifiers of claim 3 wherein the copolymerized monomer comprises 5 to 15% ethyl hexyl acrylate.

5. The flow modifiers of any of claims 1, 2, 3 or 4 wherein the weight average molecular weight is between 5,000 to 60,000.

6. The flow modifiers of claim 5 prepared by solution polymerization.

7. The flow modifiers of claim 6 having glass transition temperatures ($T_g$) between plus 20° C. to minus 40° C.

8. A waterborne coating formulation comprising:

i) a water soluble, acidic, neutralizable, solution polymerized coating resin; or ii) a water dispersible, emulsion polymerized, optionally crosslinkable coating resin; and iii) one or more flow modifiers consisting essentially of polymers having a weight average molecular weight of between 4,000 and 450,000 of polymerized monomers on a weight basis as follows:

40 to 96% $C_1$ or $C_2$ alkyl acrylate or mixtures thereof;

4 to 12% acrylic acid; and 0 to 48% copolymerized $C_3$ or higher acrylic acid ester monomer; said polymers serving to modify flow of said coating formulations during application to a substrate.

9. The formulation of claim 8 wherein the flow modifier concentration (based on coating resin solids) is less than 1 weight %.

* * * * *

UNITED STATES PATENT AND TRADEMARK OFFICE
CERTIFICATE OF CORRECTION

PATENT NO. : 5,621,059

DATED : April 15, 1997

INVENTOR(S): WILLIAM A. DUPONT ET AL.  Page 1 of 2

It is certified that error appears in the above-identified patent and that said Letters Patent is hereby corrected as shown below:

<u>COLUMN 1</u>

Line 22, "Now" should read --New--.
    Line 40, "monomer. The" should read --monomer. ¶ The--.

<u>COLUMN 4</u>

Line 27, "cycloaliphaticpolycar-" should read
        --cycloaliphatic polycar---.

<u>COLUMN 6</u>

Line 6, "as" should read --as,--.

<u>COLUMN 7</u>

Line 2, "dupont)" should read --duPont--.

<u>COLUMN 8</u>

Line 11, "type 72-7203" should read --type 072-7203--.
    Line 18, "TiO2" should read --$TiO_2$--.
    Line 36, "TiO2" should read --$TiO_2$--.
    Line 59, "TiO2" should read --$TiO_2$--.

UNITED STATES PATENT AND TRADEMARK OFFICE
CERTIFICATE OF CORRECTION

PATENT NO. : 5,621,059

DATED : April 15, 1997

INVENTOR(S) : WILLIAM A. DUPONT ET AL.    Page 2 of 2

It is certified that error appears in the above-identified patent and that said Letters Patent is hereby corrected as shown below:

<u>COLUMN 9</u>

Line 8, "TiO2" should read --TiO$_2$--.
    Line 27, "176.0 (80% non-volatiles)" should read
      --80% non-volatiles) 176.0--.
    Line 32, "35 from Exxon Chemical" should read
      --from Exxon Chemical 35--.

<u>COLUMN 10</u>

Line 25, "concentration" should read --concentrations--.

<u>COLUMN 11</u>

Table 3-continued, Under "Example 16, Ex. 7", "63.8"
      should read --53.8--.

Signed and Sealed this

Eighth Day of February, 2000

Attest:

Q. TODD DICKINSON

*Attesting Officer*    *Commissioner of Patents and Trademarks*